(12) United States Patent
Hong et al.

(10) Patent No.: US 7,309,385 B2
(45) Date of Patent: Dec. 18, 2007

(54) EFFICIENT 3-D NANOSTRUCTURED GAS SEPARATION MEMBRANES

(75) Inventors: Jae-Min Hong, Seoul (KR); Won Il Son, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 363 days.

(21) Appl. No.: 11/022,058

(22) Filed: Dec. 22, 2004

(65) Prior Publication Data

US 2005/0204920 A1 Sep. 22, 2005

(30) Foreign Application Priority Data

Mar. 18, 2004 (KR) ...................... 10-2004-0018226

(51) Int. Cl.
*B01D 53/22* (2006.01)

(52) U.S. Cl. ............................ 96/11; 96/4; 96/7; 96/8; 96/10; 95/45; 95/47; 95/51; 210/490; 210/500.21; 210/500.22; 210/500.23

(58) Field of Classification Search ...................... 96/4, 96/6, 7, 8, 10, 11, 12, 13, 14; 95/45, 47, 95/51; 210/644, 490, 500.22, 500.21, 500.23
See application file for complete search history.

(56) References Cited

U.S. PATENT DOCUMENTS

| | | | | |
|---|---|---|---|---|
| 5,798,042 A * | 8/1998 | Chu et al. | ................ | 210/490 |
| 5,948,255 A * | 9/1999 | Keller et al. | ................ | 210/490 |
| 6,048,383 A * | 4/2000 | Breault et al. | .................... | 96/7 |
| 6,425,936 B1* | 7/2002 | Sammons et al. | ............... | 96/4 |
| 6,497,749 B2* | 12/2002 | Kesten et al. | .................. | 96/11 |
| 6,685,810 B2 | 2/2004 | Noca et al. | ........... | 210/500.22 |
| 6,810,899 B2* | 11/2004 | Franz et al. | .................... | 96/11 |
| 6,913,697 B2* | 7/2005 | Lopez et al. | ................ | 210/644 |
| 6,977,009 B2* | 12/2005 | Pan et al. | ....................... | 96/13 |
| 7,108,813 B2* | 9/2006 | Kang et al. | ............ | 210/500.25 |
| 7,144,444 B2* | 12/2006 | Takatani et al. | ................ | 96/11 |
| 2003/0102263 A1 | 6/2003 | Lopez et al. | | |
| 2004/0173506 A1* | 9/2004 | Doktycz et al. | ............ | 210/490 |
| 2005/0269743 A1* | 12/2005 | Kroupenkine et al. | ....... | 425/127 |

FOREIGN PATENT DOCUMENTS

| | | |
|---|---|---|
| KR | 0219839 B1 | 9/1999 |
| KR | 2002-1035 A | 1/2002 |

* cited by examiner

*Primary Examiner*—Jason M. Greene
(74) *Attorney, Agent, or Firm*—Jones Day

(57) ABSTRACT

There is provided a high efficient gas separation membrane of two or more layers, which comprises a separating layer of 3-dimensional nanostructure and a supporting layer, wherein the 3-dimensional nanostructure can maximize a surface area per unit permeation area.

11 Claims, 9 Drawing Sheets

(a)                      (b)

EFFICIENT 3-D NANOSTRUCTURED GAS SEPARATION MEMBRANES

FIELD OF THE INVENTION

The present invention relates to a gas separation membrane having an excellent permeability and selectivity. More specifically, the present invention relates to a gas separation membrane with a high separation selectivity and comprising two or more layers, including a supporting layer and a separating layer of 3-dimensional (D) nanostructure that can maximize a surface area per unit permeation area.

BACKGROUND OF THE INVENTION

The gas separation membrane has been utilized in various processes, which are deemed industrially important, such as air separation, separation of carbon dioxide from a natural gas, separation of nitrogen or hydrocarbon and hydrogen in petrochemistry process and the like. The gas separation membrane achieves the necessary selectivity that allows for separation of a desired gas and high permeability.

However, a membrane generally shows so-called trade-off phenomenon with respect to the selectivity and the permeability. That is, the membrane having the high selectivity shows low permeability, while the membrane having the high permeability shows low selectivity (Moaddeb Maryam et al., J. Membrane Sci., 1997, 125, 144).

Although many researchers have investigated various new materials to develop the highly efficient gas separation membrane that overcomes such trade-off phenomenon, there has been no discovery of such membranes so far (Pratibha Pandey, R. S. Chauha, Progress in Polymer Science, Vol. 26, Issue 6, 2001, 857).

An asymmetric membrane, which has a minimal thickness capable of maintaining its mechanical strength, was developed to prepare such highly efficient membrane on the basis that the permeation rate of gas is inversely proportional to the thickness of the membrane (H. Strathmann, K. Knock, P. Amar and R. W. Baker. Desalination 16 (1975), p. 179). Thereafter, more improved asymmetric membranes were developed. Although the permeation rate was increased, such asymmetric membranes, however, were deficient in that they contain pinholes that cause much pressure loss and decrease of selectivity.

Further, there has been developed a method that increases the gas permeation due to the increase of the permeation area, wherein a hollow fiber membrane is made in a form of bundle and both ends thereof are fixed with a thermosetting resin, such as epoxy resin or a hot melt thermoplastic resin, to fabricate the membrane as a membrane module (Membrane Separations Technology, Principles and Applications, Elsevier, 1995, pp. 467-498). The module has the increased permeation rate, but has the lower separation selectivity. Thus, it is difficult to achieve the module having a lightweight and small size. Furthermore, the module is disadvantageous since the fed gas has to be purified in advance.

SUMMARY OF THE INVENTION

The object of this invention is to provide a gas separation membrane of high performance without any of the above disadvantages associated with the prior art.

The inventors found that if a separating layer is prepared to have a 3-D nanostructure, it is possible to obtain the gas separation membrane having high permeability and selectivity per unit area.

Therefore, the present invention provides the gas separation membrane of high performance having the high permeability and selectivity, which can be obtained by overcoming the trade-off phenomenon based on the new concept in order to maximize the surface area per unit area, that is, the effective separation area by preparing the separating layer having the 3-D nanostructure. According to the present invention, a membrane having lighter weight and smaller size can be prepared due to the increase of gas separation efficiency per unit time and volume of the membrane module, which can be caused by the high permeability and selectivity.

DETAILED DESCRIPTION OF THE PREFERRED EMBODIMENTS

The gas separation membrane of the present invention will be described in detail below.

The gas separation membrane of the present invention is characterized in that the membrane has a high effective separation area by the 3-D nanostructure of the separating layer showing the selectivity and is a composite membrane, wherein two or more layers including the separating layer and a supporting layer are laminated.

The separating layer of the gas separation membrane according to the present invention has a 3-D nanostructure. Such 3-D nanostructure may take the form of various shapes such as an array of tube, hollow fiber, plate or sphere, depending on the material intended for separation and use thereof. Considering that the surface area per unit area is maximized, a person of ordinary skill in the art will appreciate that other shapes of 3-D nanostructure are included in the present invention.

Figure 1:
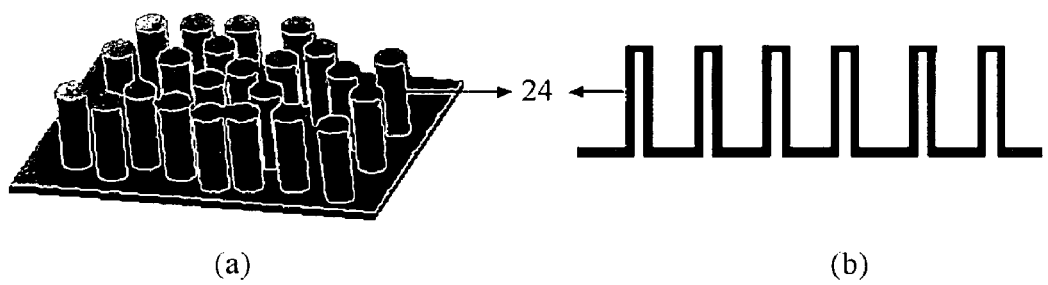
FIG. 1 schematically depicts the separating layer of a tube form having 3-D nanostructure of the present invention.

FIG. 1 schematically depicts the separating layer 24 of a tube form having the 3-D nanostructure of the present invention. In FIG. 1, portion in the tube form is several nanometers to several tens micrometers. The thickness of the protruded portion in the tube form is several nanometers to hundreds nanometers. The diameter and thickness are dependent on the material intended for separation and use thereof. Also, the length of each protrusion can be several tens nanometers to several millimeters. Preferably, the lengths are as long as possible. Such tube form is preferred in that if the length is maximized with minimizing the diameter within an acceptable mechanical strength, the surface area per unit area becomes the maximum. Further, as the number of tubes per unit area is increased, the effective separation area is maximized more effectively Moreover, the thinner thickness is preferred for the permeability.

The separating layer may be comprised of an organic polymer, an inorganic material, or the mixture of the organic polymer and the inorganic material, depending on the gas intended for separation. The organic polymer includes, but is not limited to, polycarbonate, polydimethylphenylene oxide, polysulfone, polyimide, polypyrrole, polyaniline, polyvinyl alcohol, and the mixture and copolymer thereof. The inorganic material includes, but is not limited to, titania, silica, zirconia, alumna and graphite carbon. Any materials showing the high separation permeability can be used as the separating layer of the present invention.

The supporting layer of the gas separation membrane according to the present invention has a high permeability and serves to maintain the mechanical strength of the membrane. Furthermore, the layer can be comprised of an organic polymer, porous organic polymer, inorganic material, porous metal or the mixture thereof, depending on the gas intended for separation. The organic polymer includes, but is not limited to, natural rubber, silicone such as poly-dimethylsiloxane, poly(1-trimethylsilyl-1-propyne), polysulfone, polycarbonate, polyethylene oxide, polydimethylphenylene oxide, polyimide, polypyrrole, polyaniline, polyethylene terephthalate, and the mixture and copolymer thereof. The inorganic material includes, but is not limited to, a porous oxide such as titania, silica, zirconia and, alumina, graphitic carbon and glass. The porous metal includes, but is not limited to, stainless steel (SUS) and silver. Any materials showing the high permeability can be used as the supporting layer of the present invention.

The gas separation membrane of the present invention has a multi-layer form, including the separating layer and the supporting layer. The multi-layer form comprises at least two layers, and preferably at least three layers.

In addition, to enhance the separation and permeation effect, the gas separation membrane of the invention can be fabricated as the hollow fiber module or flat sheet module.

Also, metals (e.g., silver and gold) and porous inorganic oxides (e.g., silica, titania and the like) can be included as an additive to increase the gas permeation rate in the separating layer or the supporting layer of the gas separation membrane. The additives can be surface treated or incorporated in a hybrid form having organic-inorganic binding, if desired.

The gas separation membrane of the present invention can be prepared by the following process: First, the separating layer of 3-D nanostructure is prepared by one or more methods selected from various methods that comprise a template method using the template with various sizes of pore, the physicochemical vapor deposition using the metal or the porous inorganic oxides such as $SiO_2$, $TiO_2$, $Al_2O_3$ etc., sputtering or spray pyrolysis of porous metal, anodizing of metals such as aluminum or titanium etc., phase separation by solvent-nonsolvent used in fabricating the separation membrane, thermally induced phase separation and the like. Thereafter, the separating layer is coated with the supporting layer by an interfacial method, casting, spin coating, sol-gel method, monomer evaporization, water casting, Langmuir-Blodgett method, electro-electroless plating, and the like.

The present invention will now be described in detail with reference to the following examples, which are not intended to limit the scope of the present invention.

EXAMPLES

Example 1

Figure 2:
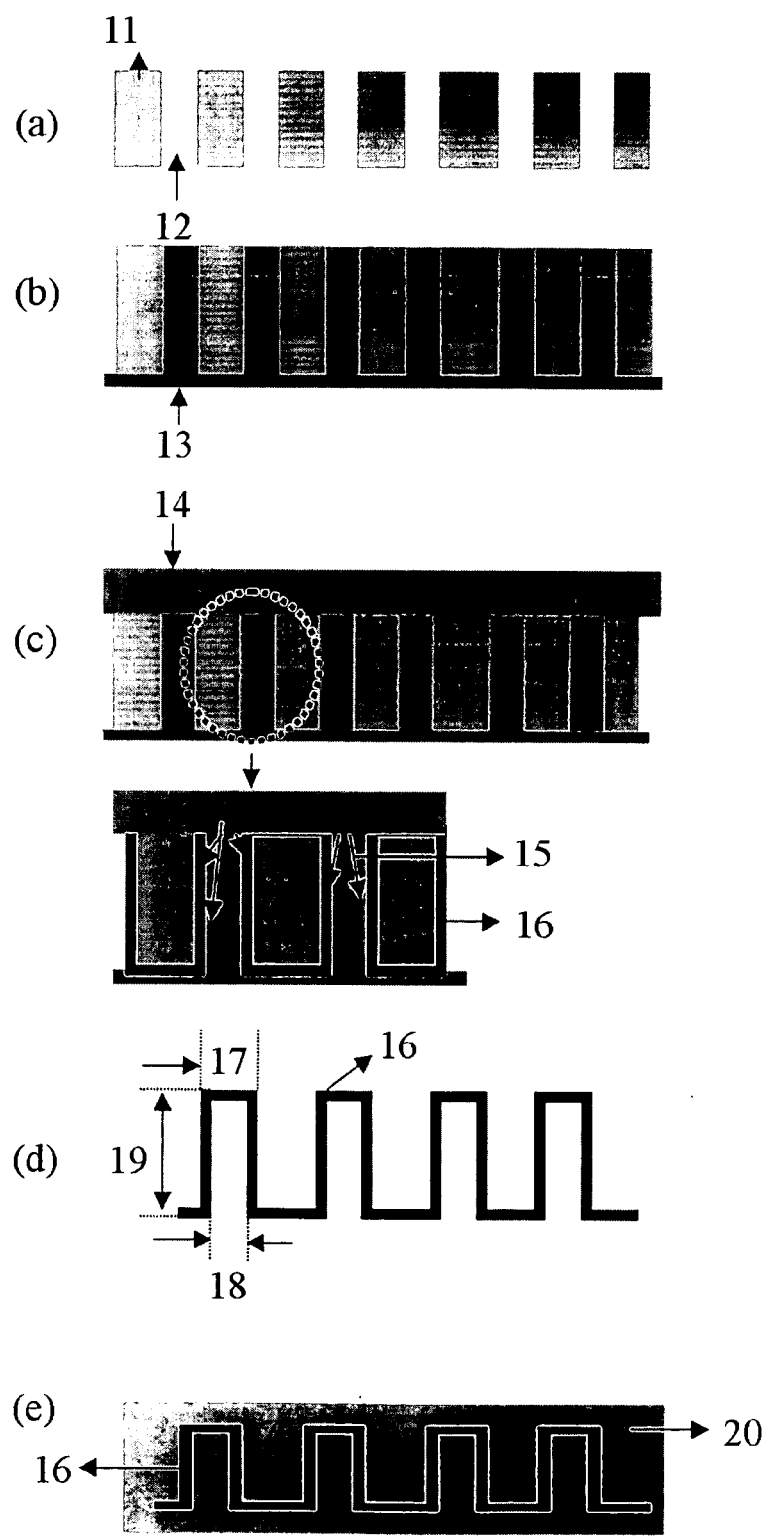
FIG. 2 shows the fabrication process of the gas separation membrane as prepared in Examples 1 to 3 of the present invention by using the template method.

The gas separation membrane of the present invention was fabricated by using the template method as shown in FIG. 2 in this example.

First, a porous polymer membrane (11), as a template made with polycarbonate having the pores (12) with the diameter of 100 nanometers, was carefully placed on 0.2M of an aqueous solution of $FeCl_3$ (13) as an oxidizing agent. The pores were filled with the aqueous solution of $FeCl_3$ due to a capillary phenomenon and thereafter 0.2 M of a pyrrole monomer solution (14) in n-hexane was slowly poured over the aqueous solution of $FeCl_3$. The pyrrole monomer was slowly diffused through the aqueous solution of $FeCl_3$ at the interfacial surface of the solution (13) and the solution (14), thereby forming the polypyrrole layer on the porous polymer membrane (11).

After polymerization for about 10 minutes, the resultant membrane was washed with methanol and ultra pure water. The porous polymer membrane (11) used in the polymerization was then removed with methylene chloride to form the polypyrrole separation membrane of nanotube type having an outer diameter of 100 nm and the thickness of 80 nm, wherein the head of the tube was closed and the opposite part was open. Thereafter, the gas separation membrane was prepared by casting polydimethylsiloxane as a support (20) on both sides of the polypyrrole separation membrane.

In the above process, the length (19) and the outer diameter (17) can be controlled depending on the used porous polymer membrane (11). The inner diameter (18) is dependent on the reaction time and temperature and the concentration of the $FeCl_3$ solution and the pyrrole.

Figure 3A:
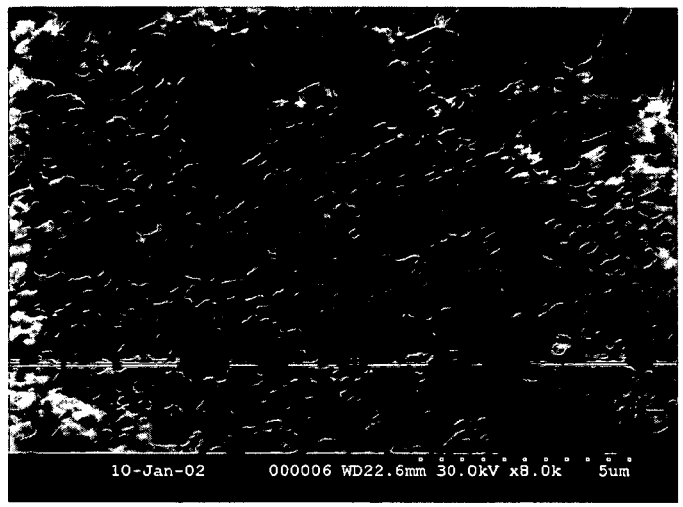
FIGS. 3a and 3b are scanning microscope photographs of the separating layer prepared by Example 1.
Figure 3B:
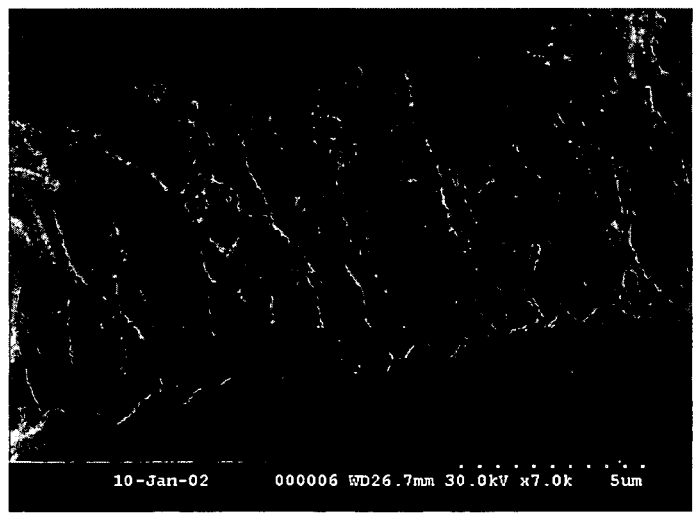

FIGS. 3a and 3b are scanning microscope photographs showing the surface and cross-section of the separating layer prepared by Example 1, respectively.

Example 2

The gas separation membrane was prepared by the same method as described in Example 1, except that the polypyrrole separation membrane of nanotube type having an outer diameter of 600 nm and the thickness of 100 nm was prepared by using the porous polymer membrane having the pores of which diameter is 600 nanometers.

Figure 4A:
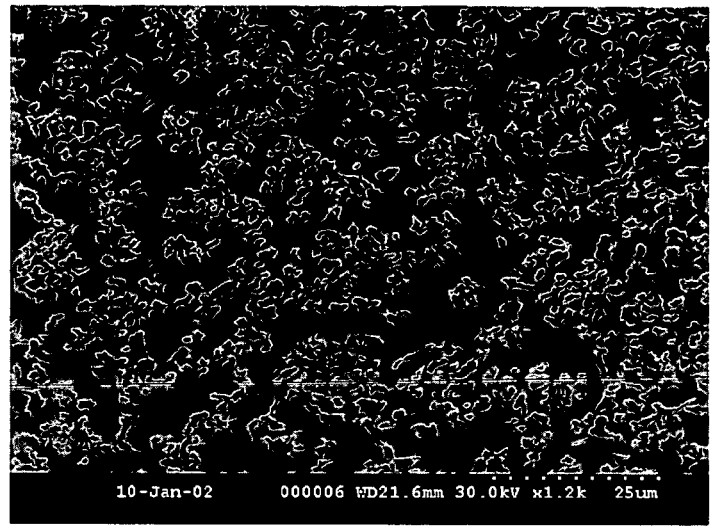
FIGS. 4a and 4b are scanning microscope photographs of the separating layer prepared by Example 2.
Figure 4B:
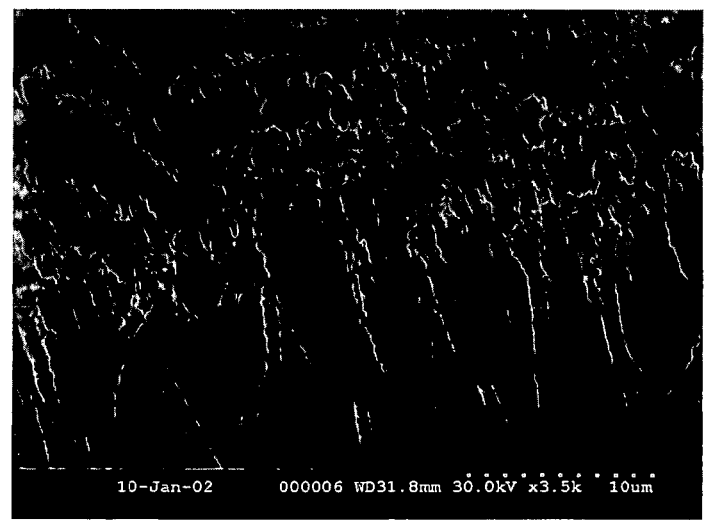

FIGS. 4a and 4b are scanning microscope photographs showing the surface and cross-section of the separating layer prepared by Example 2, respectively.

Example 3

The gas separation membrane was prepared by the same method as described in Example 1 except that the polypyrrole separation membrane of nanotube type having an outer diameter of 1,000 nm and the thickness of 200 nm was prepared by using the porous polymer membrane having the pores of which diameter is 1,000 nanometers.

Figure 5A:
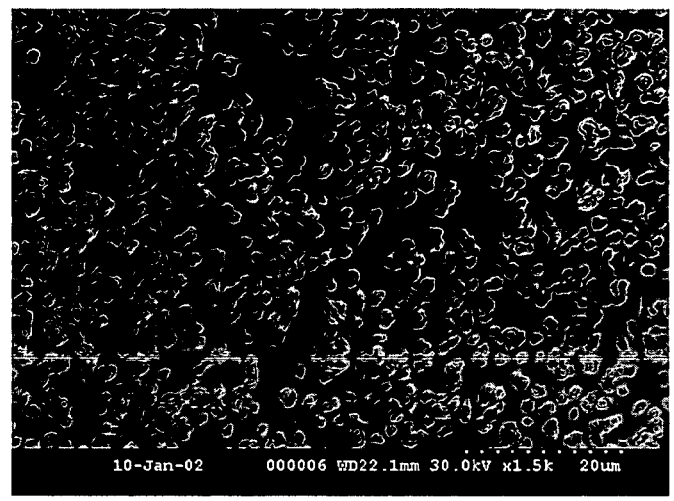
FIGS. 5a and 5b are scanning microscope photographs of the separating layer prepared by Example 3.
Figure 5B:
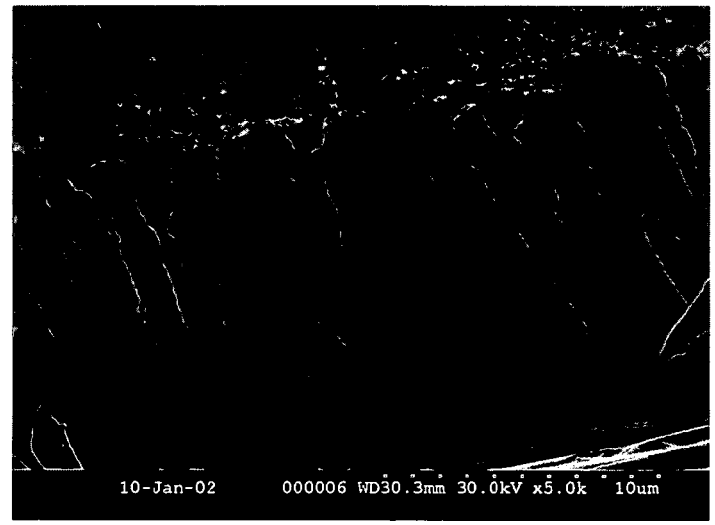

FIGS. 5a and 5b are scanning microscope photographs showing the surface and cross-section of the separating layer prepared by Example 3, respectively.

Example 4

Figure 6:
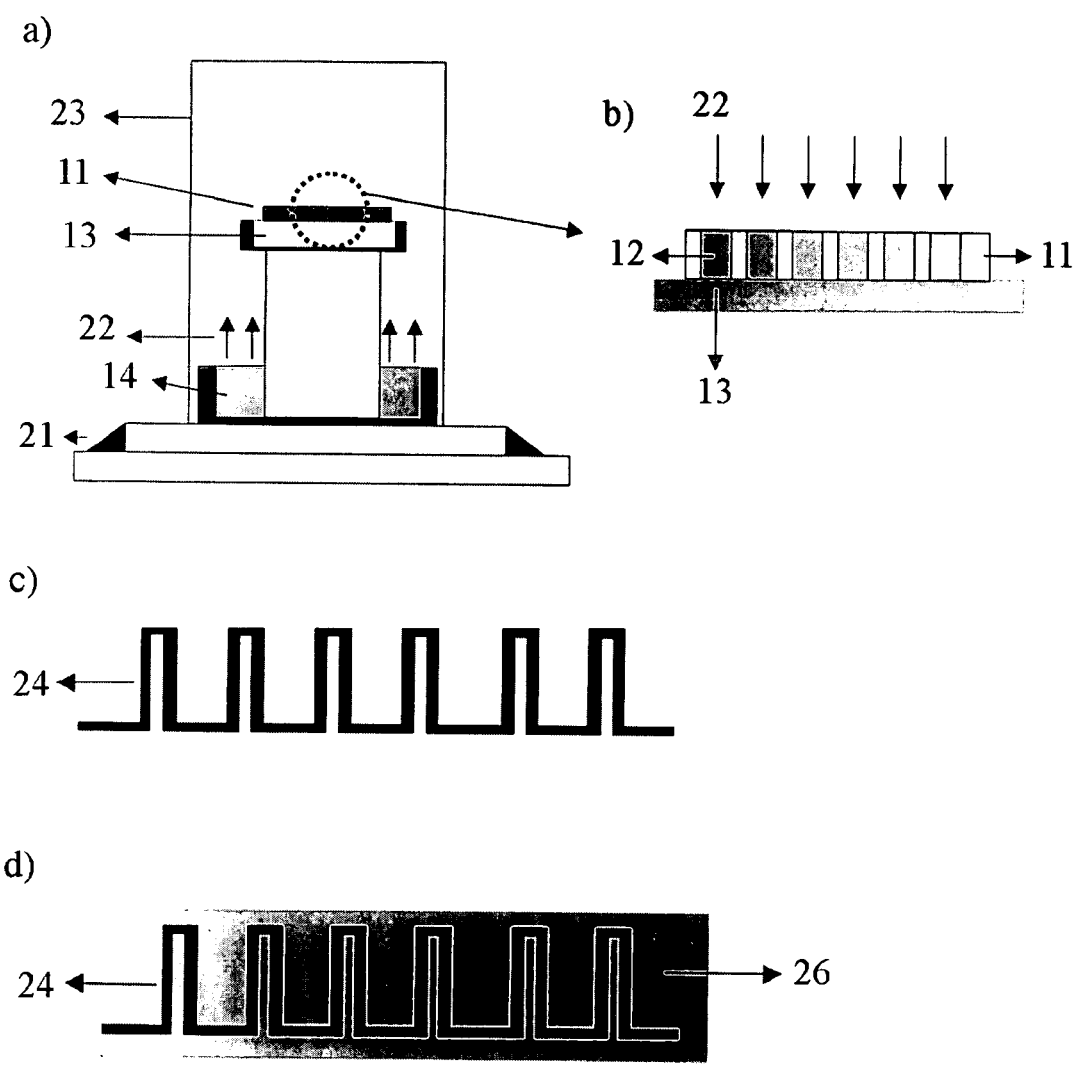
FIG. 6 shows the fabrication process of the gas separation membrane as prepared in Example 4 of the present invention by using the monomer evaporization method.

The gas separation membrane of the present invention was fabricated by using the monomer evaporization as shown in FIG. 6 in this example.

First, the porous polymer membrane (11) having a pore size of 600 nm was used and a polymerization apparatus was installed as shown in a) of FIG. 6. The polymerization apparatus was equipped with a polymerization vessel made with glass or SUS material. According to the process described in Example 1, the porous polymer membrane (11), which is made with polycarbonate having the pores (12) with the diameter of 600 nanometers, was carefully placed on 0.2M of an aqueous solution of $FeCl_3$ (13). Thereafter, 0.2 M of a pyrrole monomer solution (14) in n-hexane was introduced in the polymerization vessel and then sealed (21). The pyrrole monomer was slowly evaporated to react with $FeCl_3$ in the aqueous solution of $FeCl_3$ as shown in the arrow (22).

After polymerization for about 60 minutes, the resultant membrane was washed with methanol and ultra pure water. The porous polymer membrane (11) used in the polymerization was then removed with methylene chloride to form the polypyrrole separation membrane of nanotube type having an outer diameter of 600 nm as in c) of FIG. 6. Thereafter, the gas separation membrane was prepared by casting polydimethylsiloxane on both sides of the polypyrrole separation membrane.

Figure 7A:
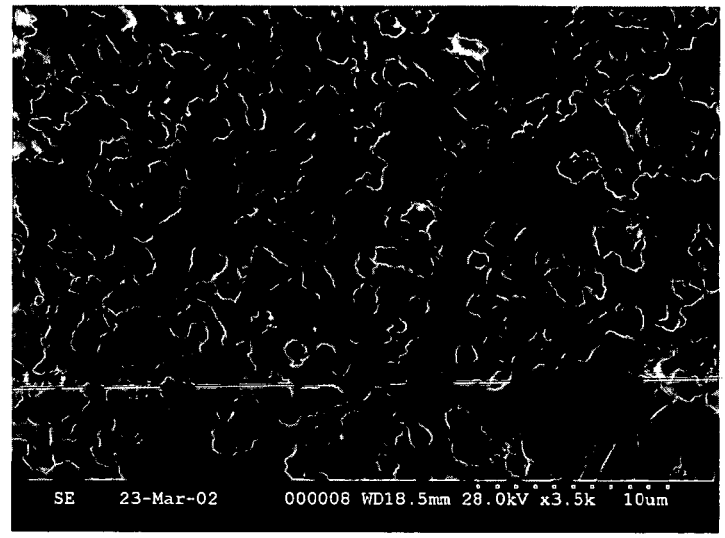
FIGS. 7a, 7b and 7c are scanning microscope photographs of the separating layer prepared by Example 4
Figure 7B:
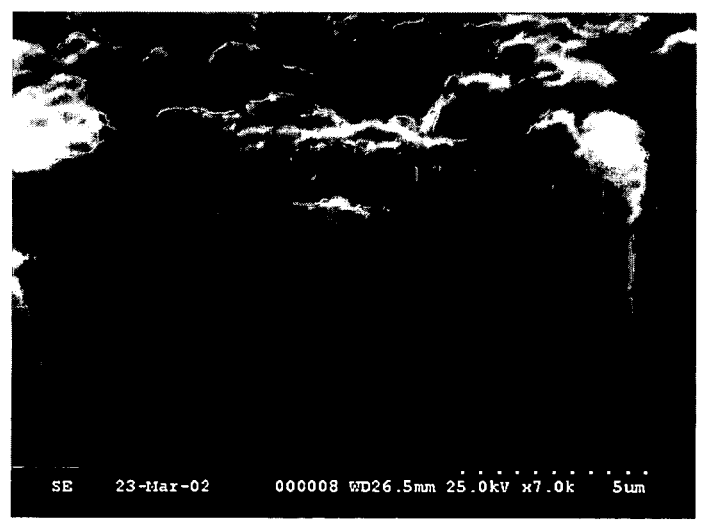
Figure 7C:
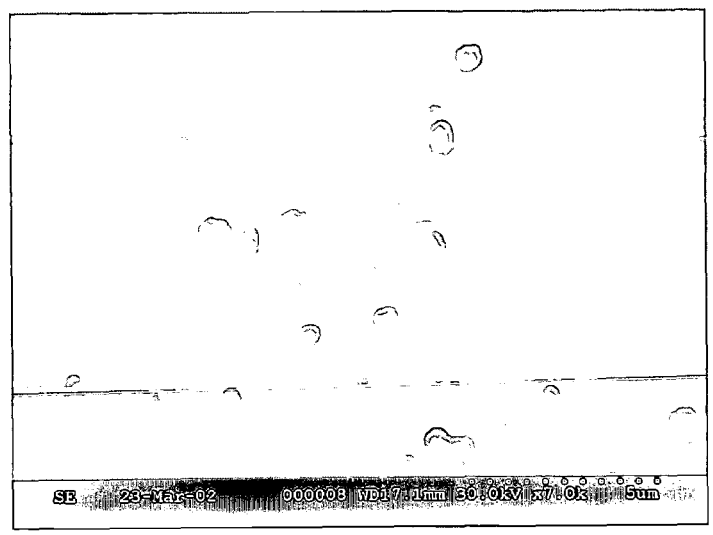

FIGS. 7a, 7b and 7c are scanning microscope photographs showing the surface, cross-section and rear side of the separating layer prepared by Example 4, respectively.

As seen in FIG. 7, the prepared polypyrrole separating layer had a bundle form of nanotube having the outer diameter of 600 nm and the thin thickness of 100 nm, and the head of the tube was closed and the bottom thereof was open.

Comparative Example

In order to compare the selectivity thereof with that of the gas separation membrane of the present invention, there was prepared a membrane that comprises the polypyrrole separating layer of a plate structure having the thickness of 100 nm and the supporting layer formed with polydimethylsiloxane by using the conventional template method.

Test Example

The membranes prepared by Examples 1 to 4 and Comparative example were determined for the gas permeability on carbon dioxide, oxygen, nitrogen and helium gas. The results are shown in the Table 1, which is provided below. The determination of the permeability was carried out by high vacuum time lag method. That is, each membrane prepared by each example was installed to a permeation cell and the temperature was constantly maintained at 35° C. Thereafter, a high vacuum of $10^{-5}$ torr was applied to the bottom of the cell by using a vacuum pump and the pressure was applied to the top of the cell. The pressure change vs. time was calculated for the respective gas that permeated the membrane. The permeability for the respective gas was obtained from the thickness, effective area and top pressure of the membrane. Furthermore, the pressure change vs. time for each membrane, which was prepared by Example 1 and Comparative example, was indicated in FIGS. 8 and 9.

TABLE 1

| | Permeability (barrer)[a] | | | | Selectivity | | |
|---|---|---|---|---|---|---|---|
| | $CO_2$ | $O_2$ | $N_2$ | He | $CO_2/N_2$ | $He/N_2$ | $O_2/N_2$ |
| Example 1 | 541.2 | 258.9 | 21.4 | 393.7 | 25.2 | 18.4 | 12.1 |
| Example 2 | 377.3 | 160.2 | 9.7 | 235.7 | 38.9 | 24.3 | 16.4 |
| Example 3 | 28.8 | 11.9 | 0.7 | 18.4 | 41.1 | 26.2 | 17.1 |
| Example 4 | 504.4 | 219.2 | 12.1 | 347.6 | 42.0 | 28.9 | 18.3 |
| Comparative Example | 4.1 | 1.7 | 0.1 | 3.2 | 40.7 | 32.0 | 17.0 |

[a]1 barrer = $10^{-10}$ $cm^3$ (STP) $cm/(cm^2 \cdot s \cdot cmHg)$

As seen in Table 1, the membranes of Examples 1 to 4 show the selectivity similar to that of the Comparative example for the respective permeation gas. However, the permeability of the membranes of Examples 1 to 4 is several tens to hundreds times as large as that of the Comparative example. Therefore, it can be noted that the membrane having the nanostructure according to the present invention is highly efficient with high permeability and selectivity. However, the membrane of Example 1 has greater gas permeability than that of Example 2, but smaller selectivity. Such results indicate that the selectivity decreases although the permeation increases. This is because the polypyrrole layer, that is the prepared separating layer, has a defect.

Figure 8:
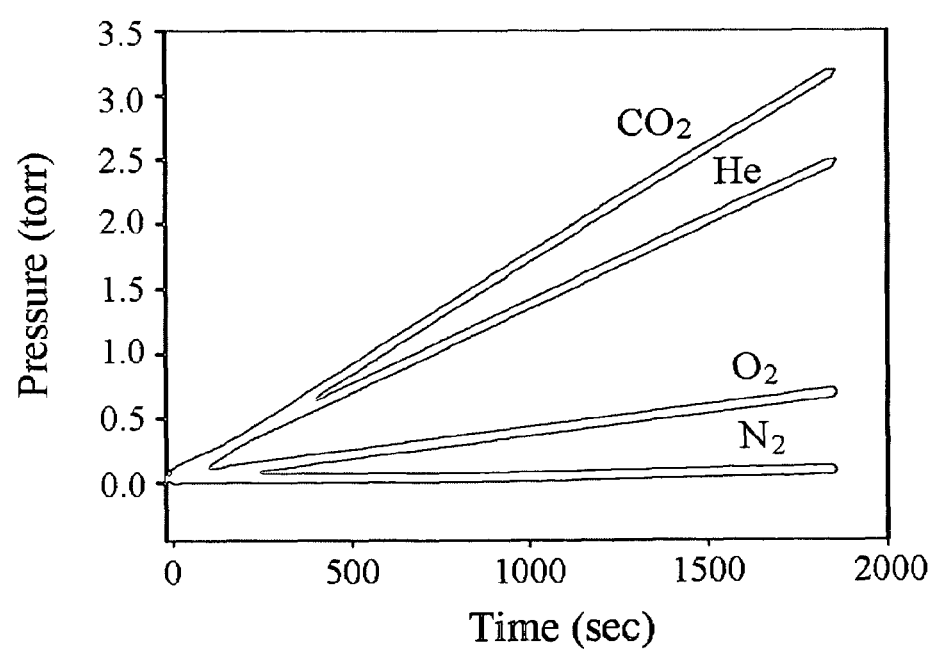
FIG. 8 is a graph showing the pressure change of gas vs. the time of the gas on membrane prepared by Example 1.
Figure 9:
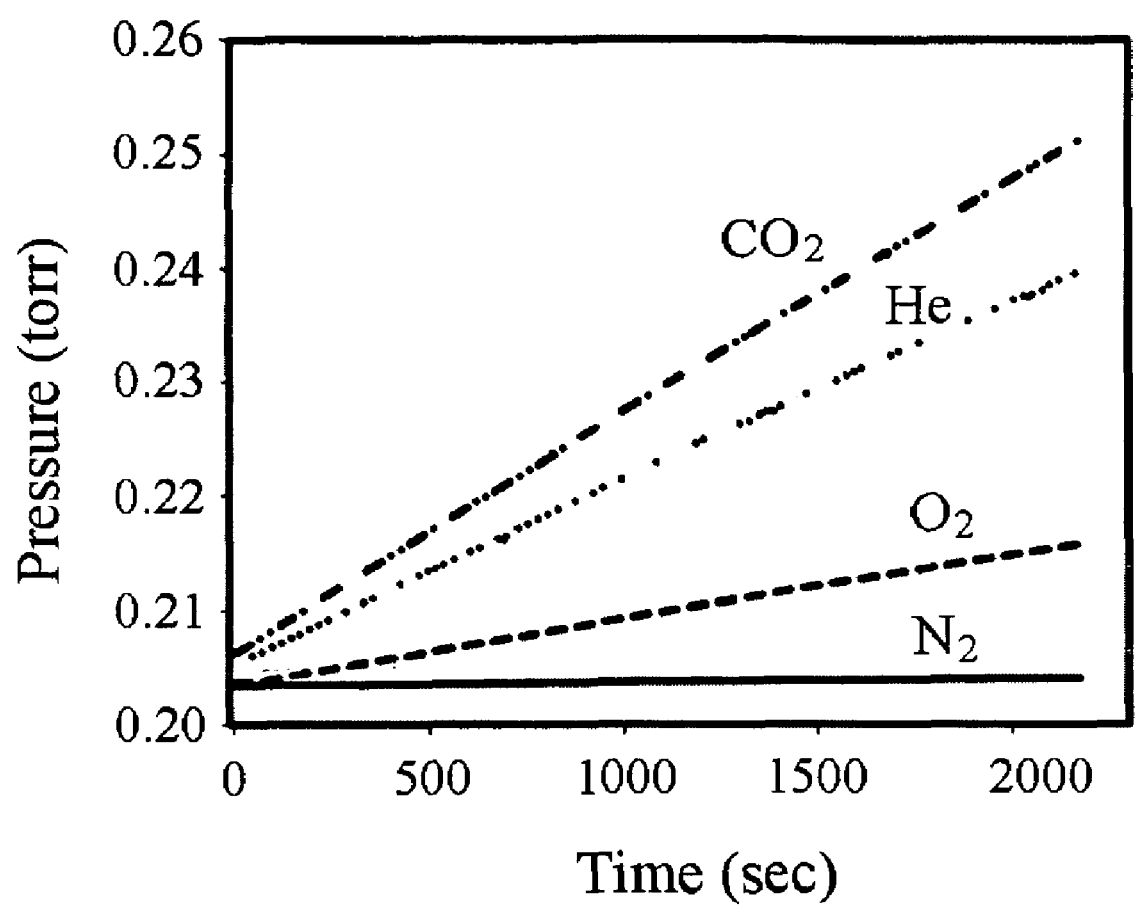
FIG. 9 is a graph showing the pressure change of gas vs. the time of the gas separation membrane prepared by Comparative example.

In summary, it was found that a particular gas intended for separation can be selectively separated by preparing 3-D nanostructured membrane having an appropriate size and diameter. Moreover, referring to FIGS. 8 and 9 showing the pressure change vs. time for the respective gas, the membrane prepared by Example 1 is shown to have much greater pressure change than that of the membrane prepared by Comparative example.

The gas separation membrane according to the present invention can have the effective separation surface area since the separating layer of 3-dimensional nanostructure thereof can maximize a surface area per unit area and achieve the high permeation selectivity. Thus, it shows both the excellent permeation rate and the better separation capability in contrast to the conventional gas separation membrane.

What is claimed is:

1. A gas separation membrane of two or more layers comprising a separating layer of 3-dimensional nanostructure and a supporting layer, wherein the 3-dimensional nanostructure contains the array of hollow tubes whose heads are closed and bottoms are open.

2. The gas separation membrane according to claim 1, wherein the separating layer is comprised of an organic polymer with a high selectivity selected from the group consisting of polycarbonate, polydimethylphenylene oxide, polysulfone, polyimide, polypyrrole, polyaniline, polyvinyl alcohol, and the mixture and copolymer thereof.

3. The gas separation membrane according to claim 1, wherein the supporting layer is fabricated from a material having a high permeability.

4. The gas separation membrane according to claim 3, wherein the supporting layer is fabricated from a material selected from the group consisting of an organic polymer, a porous organic polymer, an inorganic material, a porous metal and the mixture thereof.

5. The gas separation membrane according to claim 4, wherein the organic polymer is selected from the group consisting of natural rubber, silicone polymer, poly(1-trimethyl silyl-1-propyne), polysulfone, polycarbonate, polyethylene oxide, polydimethyiphenylene oxide, polyimide, polypyrrole, polyaniline, polyethylene terephthalate, and the mixture and copolymer thereof.

6. The gas separation membrane according to claim 4, wherein the inorganic material is selected from the group consisting of titania, silica, zirconia, alumina, carbon, glass, and the mixture thereof.

7. The gas separation membrane according to claim 4, wherein the porous metal is stainless steel or silver.

8. The gas separation membrane according to claim 1, further comprising an additive selected from the group consisting of a metal, a porous inorganic oxide and the mixture thereof.

9. The gas separation membrane according to claim 8, wherein the metal is silver or gold.

10. The gas separation membrane according to claim 8, wherein the porous inorganic oxide is silica or titania.

11. A gas separation membrane system, comprising a hollow fiber module or a flat sheet module fabricated from the gas separation membrane according to claim 1.

* * * * *